(12) United States Patent
Anthony, Jr. et al.

(10) Patent No.: US 7,571,278 B2
(45) Date of Patent: Aug. 4, 2009

(54) CONTENT ACCESS MEMORY (CAM) AS AN APPLICATION HARDWARE ACCELERATOR FOR SERVERS

(75) Inventors: Bruce Oliver Anthony, Jr., Pine Island, MN (US); Debanjan Saha, Mohegan Lake, NY (US); Zon-Yin Shae, South Salem, NY (US); Dinesh Chandra Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 11/334,831

(22) Filed: Jan. 19, 2006

(65) Prior Publication Data

US 2007/0168600 A1    Jul. 19, 2007

(51) Int. Cl.
*G06F 12/00* (2006.01)
*G06F 13/00* (2006.01)
*G06F 13/28* (2006.01)

(52) U.S. Cl. .................................................... 711/108
(58) Field of Classification Search ................. 711/108
See application file for complete search history.

(56) References Cited

U.S. PATENT DOCUMENTS

| 2005/0141508 A1* | 6/2005 | Ogawa ....................... 370/394 |
| 2006/0077989 A1* | 4/2006 | Lu et al. ..................... 370/401 |
| 2006/0212426 A1* | 9/2006 | Shakara et al. ................ 707/3 |
| 2007/0083646 A1* | 4/2007 | Miller et al. ................ 709/224 |

* cited by examiner

*Primary Examiner*—Sheng-Jen Tsai
(74) *Attorney, Agent, or Firm*—Keusey, Tutunjian & Bitetto, P.C.; Brian P. Verminski, Esq.

(57) ABSTRACT

There are provided a hardware accelerator and method for providing hardware acceleration for an application server and/or a layer 7 switch. The hardware accelerator includes a content access memory (CAM) configured to accelerate string comparison operations in the application server and/or layer 7 switch. The string comparison operations involve strings having varying key string positions.

26 Claims, 8 Drawing Sheets

CONTENT ACCESS MEMORY (CAM) AS AN APPLICATION HARDWARE ACCELERATOR FOR SERVERS

BACKGROUND

1. Technical Field

The present invention relates to hardware accelerators for servers and, more particularly, to a content access memory (CAM) as an application hardware accelerator for accelerating string comparison operations in a server.

2. Description of the Related Art

As voice over Internet protocol (VoIP) continues to grow in popularity, there is a need to support session initiation protocol (SIP) applications and provide timely response times to simultaneous SIP dialogs in a server. Turning to FIG. 1, an exemplary server cluster is indicated generally by the reference numeral 100. The server cluster 100 includes and/or interfaces with a hypertext transfer protocol (HTTP) client 110, a layer 7 switch 120, and a plurality of servers 130. The layer 7 switch 120 includes a HTTP uniform resource locator (URL) routing module 122, a round robin routing module 124, and a network address translation (NAT) packet delivery subsystem 126. Each of the servers 130 includes HTTP applications 132 and a protocol-processing module 134.

A server cluster, such as that shown in FIG. 1, may be used to achieve scalability for transmission control protocol/hypertext transfer protocol (TCP/HTTP) applications. A typical server cluster may include a layer 7 switch as a front end to a set of servers at the back end. Both the layer 7 switch and servers may be SIP aware. The layer 7 switch may route the affiliate SIP packets to the same server.

In general, a layer 7 switch is a web switch that routes packets at the application layer (i.e., layer 7) of the Open Systems Interconnection (OSI) protocol stack. A layer 7 switch may perform content-aware routing and may establish a transmission control protocol (TCP) connection with a client and then receive a hypertext transfer protocol (HTTP) request at the application layer. A layer 7 switch may also be referred to as a content switch or a web switch.

A layer 7 switch may be used to route the service request from the client to one of the back end servers for serving the request. For some applications, every HTTP request is independent of each other. In this case, a round robin routing algorithm may be used to route and evenly distribute requests to the server. However, for other applications, there may be correlations among the sequences of the requests. In this case, a layer 7 routing algorithm may be used to route all these requests, which may be routed to the same server for processing. The layer 7 routing algorithm may be completely dependent on the application. For TCP/HTTP applications, algorithms that may be used include source Internet protocol (IP) address routing and session cookie routing. Some SIP applications may have to route all of the SIP packets of the same dialog to the same server, such that round robin routing is not appropriate.

Complicated string matching applications may also now appear frequently in the server environment. These applications and protocols may call for inspection of the packet payload at line rates to detect and filter packets that include desired large set of complicated strings. Some examples of such applications include, but are not limited to, virus detection, search engines, distillery applications, and so forth. The IP packet payload may be parsed to identify the positions and contents of key search strings. SIP protocol presents one example. Currently, a traditional software string parser and hash table performs the parsing. However, for some applications like SIP applications, the number of simultaneous packet payload inspection operations may be very large. Accordingly, the performance of software packet payload inspection operation is often too slow, and a mechanism is often needed to accelerate the speed.

SIP protocol can also makes layer 7 routing much more complex due to the fact that its transaction and dialog state is distributed and deeply inside the packet payload. Turning to FIG. 2, a typical SIP packet is indicated generally by the reference numeral 200. There may be several transactions in a lifetime of a SIP dialog. Each transaction may have its own unique transaction ID specified by the branch parameter of the current "via" header 202. Each SIP dialog is defined by 3 strings (Dialog ID): a Call-ID string; a From tag string; and a To tag string. The Call-ID string and the From tag string appear in the INVITE message by the caller as the beginning of a SIP dialog. The "To" tag string is filled by the callee in response to an indication to establish the SIP dialog. Subsequently, every SIP message belonging to this dialog may include this SIP dialog ID.

SIP is an extensive string matching operation and asynchronous protocol. Moreover, for a SIP Softswitch, a proxy server, and other application servers, it is possible to queue up millions of on-going SIP transactions/dialogs. As soon as a SIP request is created or a response is received in the SIP server, the server may have to search and match the packet payload strings out of the millions of session queues to identify the specified session and the state of the specified session. The current SIP implementation is to use the SIP transaction ID and dialog ID strings as a key to store the session state into a software hash table. However, the string parsing and comparisons often consume a large amount of CPU power and may not be able to handle a large amount of simultaneous SIP sessions. Moreover, a large number of entries in the hash table and a long string of keys can degrade the performance of the hash table. This may present a major speed bottleneck. Consequently, a hardware accelerator is needed for a SIP layer 7 switch as well as for SIP application servers.

SUMMARY

The above and other problems of the prior art are solved by the present invention, which is directed to a content access memory (CAM) as a hardware accelerator for string comparison operations in a layer 7 switch and/or a server.

According to an aspect of the present invention, there is provided a hardware accelerator. The hardware accelerator includes a content access memory (CAM) configured to accelerate string comparison operations in an application server. The CAM includes a key string position identification mechanism. The key string position identification mechanism is configured to identify positions of key strings in input strings to the CAM. The positions of the key strings are variable within the input strings.

According to another aspect of the present invention, there is provided a method for providing acceleration in an application server. The method includes accelerating string comparison operations in the application server using a content access memory (CAM). The accelerating step includes identifying positions of key strings in input strings to the CAM. The positions of the key strings are variable within the input strings.

According to yet another aspect of the present invention, there is provided a hardware accelerator. The hardware accelerator includes a content access memory (CAM) configured to accelerate string comparison operations in a layer 7 switch. The CAM includes a key string position identification mechanism. The key string position identification mechanism is configured to identify positions of key strings in input strings to the CAM. The positions of the key strings are variable within the input strings.

According to a further aspect of the present invention, there is provided a method for providing acceleration in a layer 7 switch. The method includes accelerating string comparison operations in the layer 7 switch using a content access memory (CAM). The accelerating step includes identifying positions of key strings in input strings to the CAM. The positions of the key strings are variable within the input strings.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
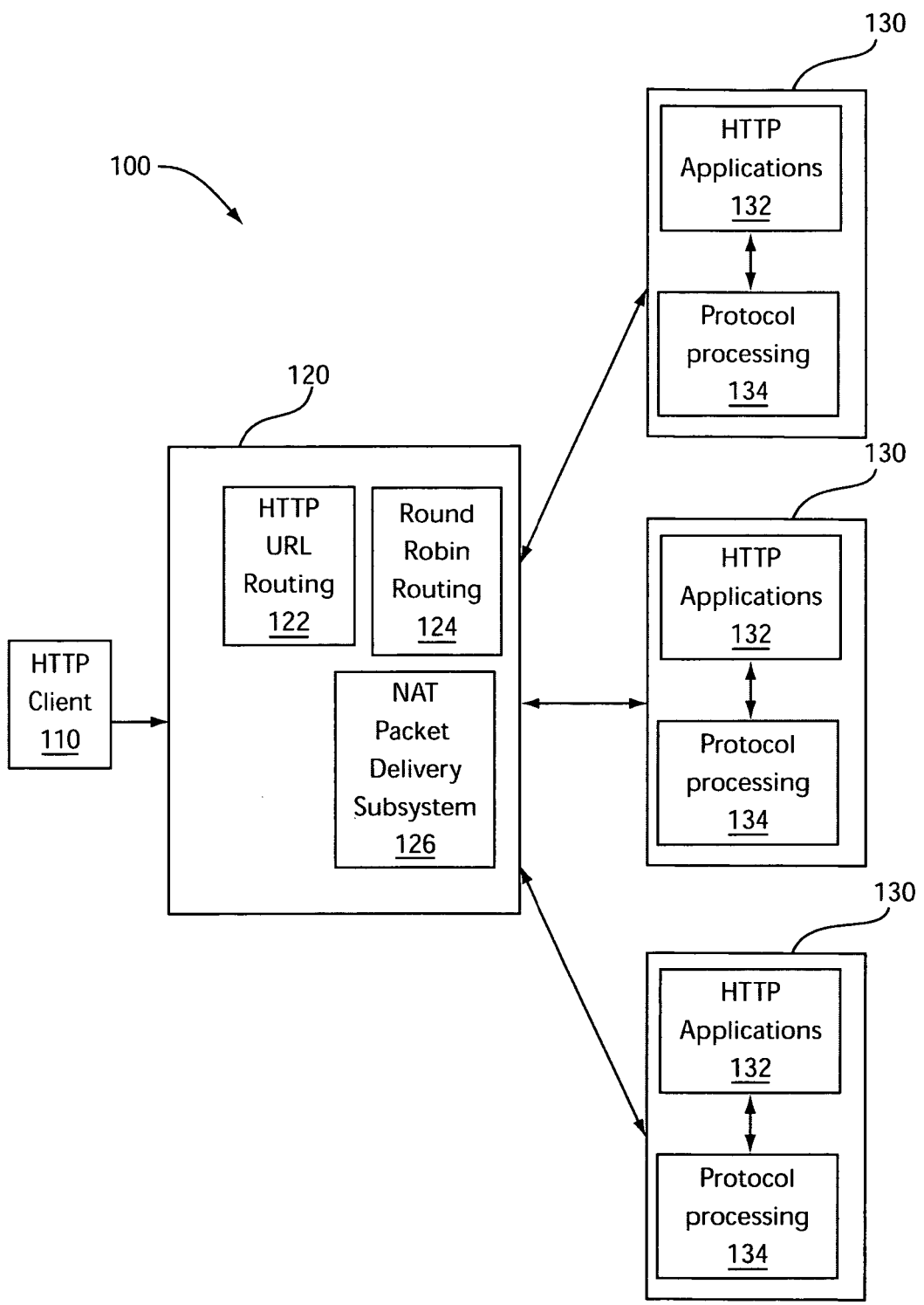
FIG. 1 is a block diagram of a server cluster in accordance with the prior art.
Figure 2:
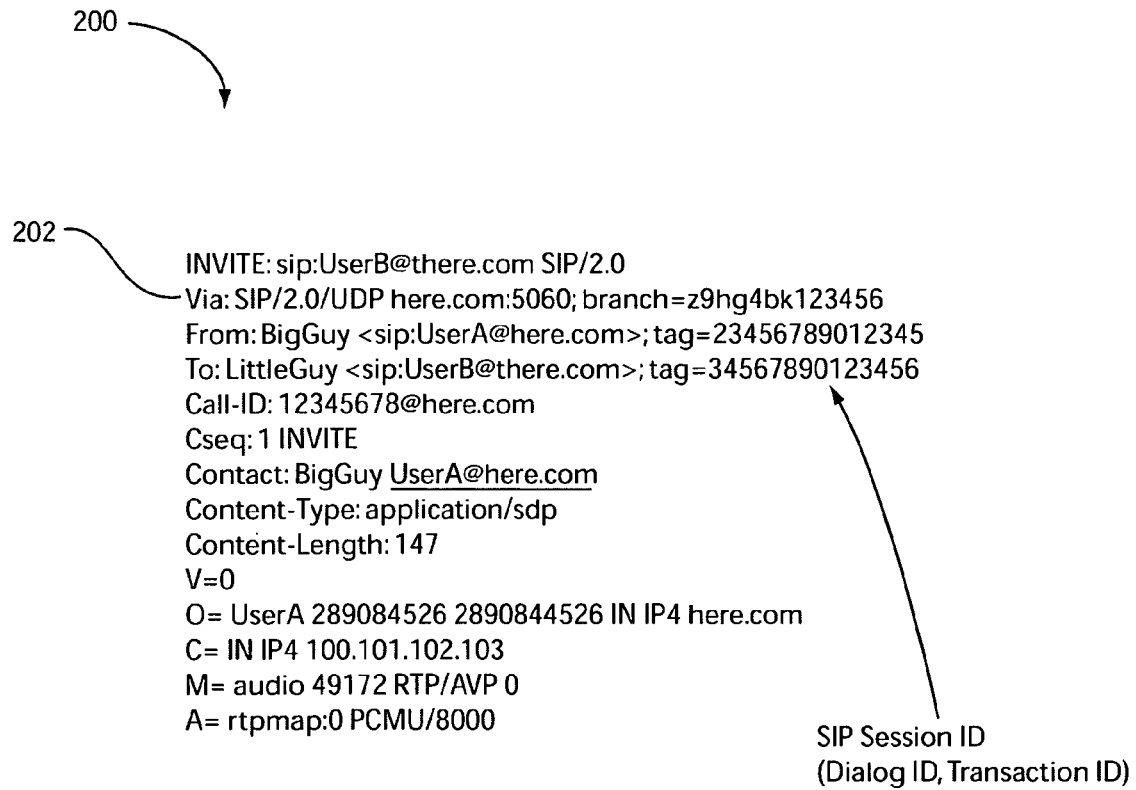
FIG. 2 is a diagram of a typical SIP packet to which the present invention may be applied.

The present invention is directed a content access memory (CAM) as a hardware accelerator for string comparison operations in a layer 7 switch and/or an application server such as, for example, a session initiation protocol (SIP) application server. The CAM may be used to inspect the packet payload at line rates to detect and filter packets that include a desired large set of complicated strings.

It should be understood that the elements shown in the figures may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, middleware, resident software, microcode, and so forth.

Furthermore, the invention can take the form of a computer program product accessible from a computer-usable or computer-readable medium providing program code for use by or in connection with a computer or any instruction execution system. For the purposes of this description, a computer-useable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
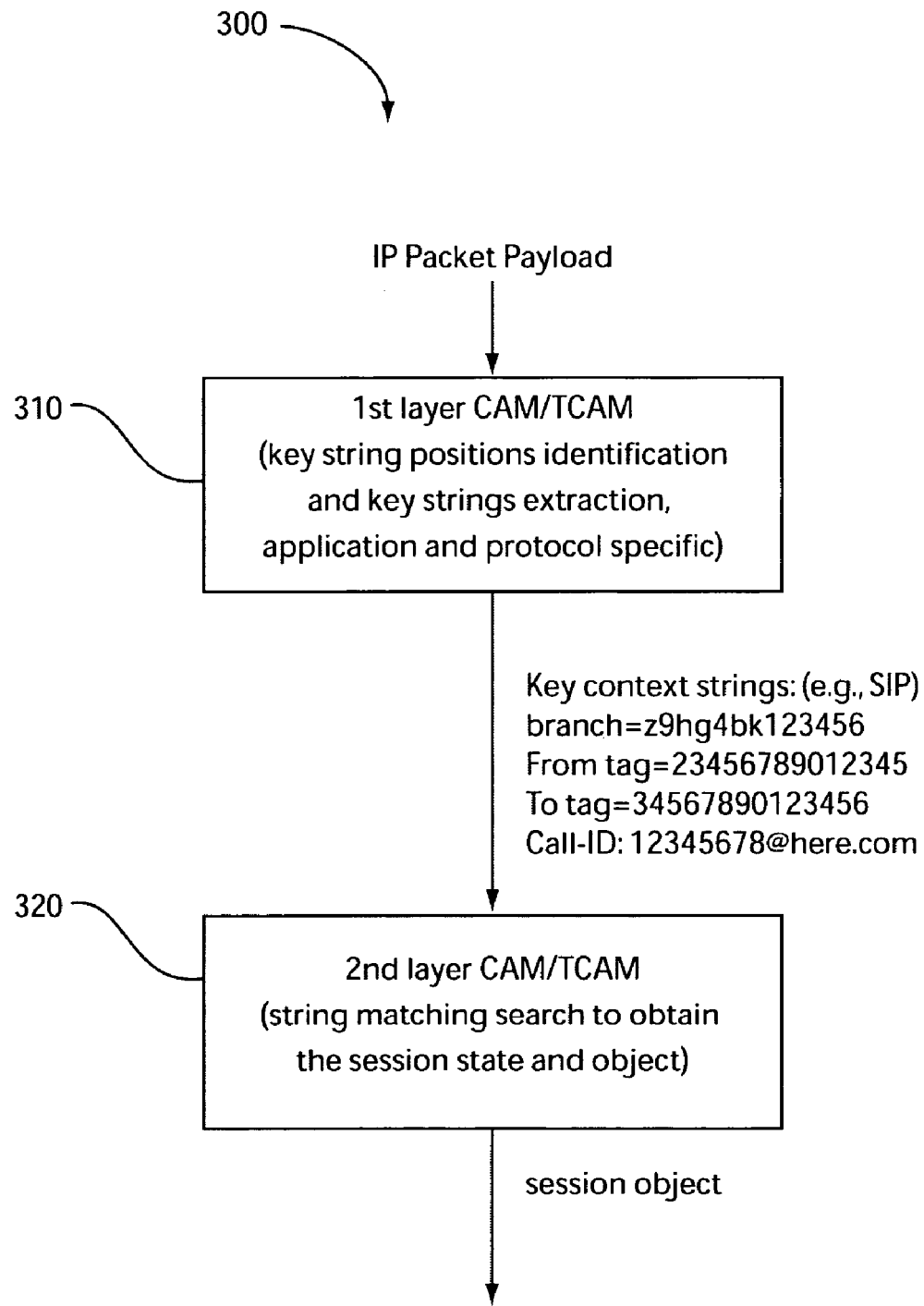
FIG. 3 is a block diagram of a two-layered CAM/TCAM hardware accelerator in accordance with the principles of the present invention.

Referring now in detail to the figures in which like numerals represent the same or similar elements and initially to FIG. 3, an embodiment will illustratively be described in terms of a two-layered CAM/TCAM to demonstrate concepts in accordance with the present invention.

Turning to FIG. 3, a two-layered CAM/TCAM hardware accelerator is indicated generally by the reference numeral 300. A first layer 310 of the CAM/TCAM hardware accelerator 300 is for identifying the position and extracting the contents of the strings that need to be searched. In particular, the first layer 319 identifies the position of key strings that, as used herein, refers to strings or portions of strings of interest. The key strings may have varying (i.e., non-fixed) positions with a payload and/or within a larger string. It is to be noted that the terms strings and key strings may be used interchangeably herein. The first layer 319 may be considered to include a key string position identification mechanism and a key string content extraction mechanism for performing the above-described functionality.

A second layer 320 of the CAM/TCAM hardware accelerator 300 is for obtaining the session state or an index to the session state, based on the contents extracted by the first layer 310. The second layer 320 performs string matching operations, and may be considered to include a string comparison criteria module (not explicitly shown in FIG. 3) for allowing a computer process and/or application to set string comparison criteria for use in the string comparison operations. Moreover, the second layer may be considered to include to a key string comparison mechanism for performing the above-described functionality.

The first layer 310 may be configured to be application and protocol specific. For example, the output of the first layer 310 can be the Call-ID and From tag for the SIP protocol. The second layer 320 may be configured to be dependent upon the session state object. For example, for the layer 7 switch, the output of the second layer 320 can be the server ID to which this SIP packet should be routed. For the SIP application server in this example, the output of the second layer 320 can be the SIP dialog state and the session state object (e.g., the related SIP headers strings) associated with the SIP dialog state.

The CAM/TCAM reduces the string-matching overhead, so as to improve performance. The CAM/TCAM may be used to inspect the packet payload at line rates to detect and filter packets that include a desired large set of complicated strings. The CAM/TCAM can perform parallel string searching at high speed (e.g., 4 ns). This will dramatically accelerate the SIP layer 7 switch as well as an application server such as a session initiation protocol (SIP) application server.

In SIP, the SIP dialog ID is deeply inside the packet payload. The position of the SIP dialog ID may not be fixed and there may be multiple strings in different positions within the SIP dialog ID in the packet payload strings. String searching and matching often entails finding out the positions of the key strings and also extracting the key strings. In some cases, the key strings for search are long and the searching pool is very large. Moreover, the search time performance degrades with a software cache implementation.

Figure 4:
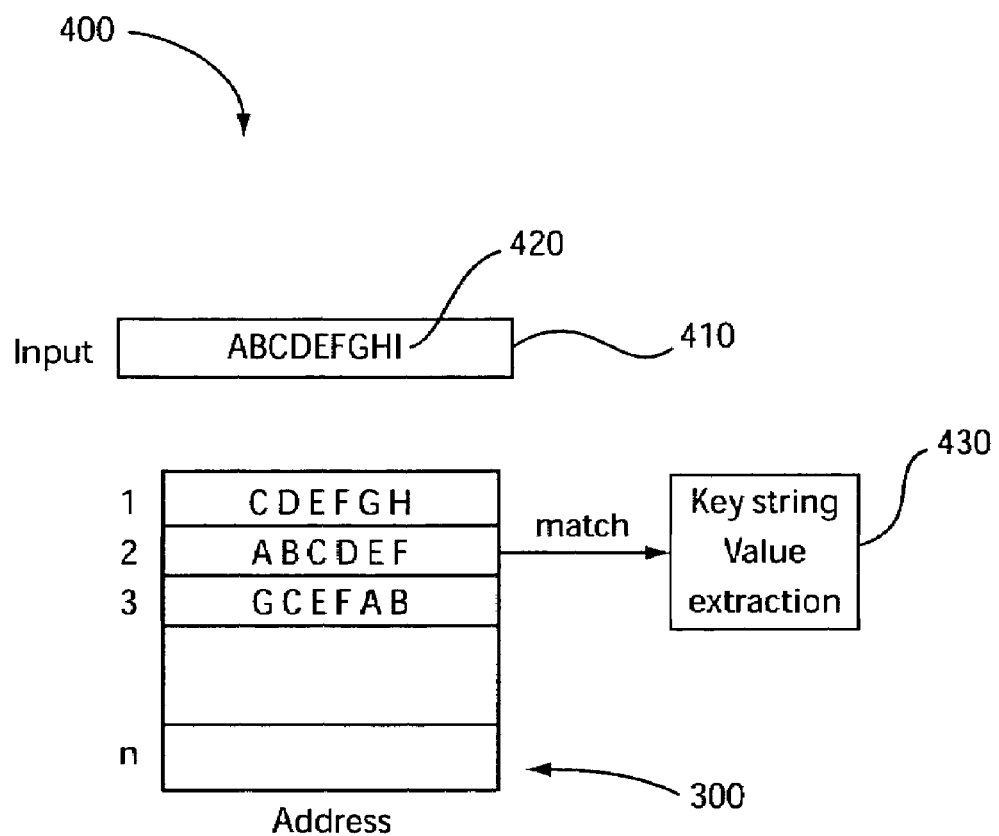
FIG. 4 is a block diagram showing packet pre-processing for a first layer of a two-layered CAM/TCAM hardware accelerator in accordance with the principles of the present invention.

Turning to FIG. 4, packet pre-processing for a first layer of a two-layered CAM/TCAM hardware accelerator is indicated generally by the reference numeral 400. The packet pre-processing 400 may be performed for a first layer of a two-layered CAM/TCAM hardware accelerator such as the first layer 310 of the hardware accelerator 300 shown in FIG. 3, and is described as such herein. Of course, given the teachings of the present invention provided herein, one of ordinary skill in this and related arts may employ the pre-processing 400 with respect to other multi-layered CAM/TCAM hardware accelerators while maintaining the scope of the present invention.

Slide windowing a packet string 420 of a packet 410 byte by byte may be utilized to provide an input to the CAM/TCAM hardware accelerator 300. The "windowed" segment of the packet string 420 may be compared, in parallel, against some or all entries in the CAM/TCAM hardware accelerator 300. A value of a key string 430 is extracted and outputted from the CAM/TCAM hardware accelerator 300 when a match is found.

The number and content of entries may be application and protocol specific. For SIP, these entries can be, but are not limited to, "Call-ID", "From", "tag", "To", "branch". There are some timing sequences that should be considered. For example, the "From tag" value can be extracted in the following sequence: first checking the match of "From" string, and then the first "tag" string. A similar approach may be applied to the "To tag". Each entry in the CAM/TCAM hardware accelerator may have, e.g., 0, 1, and X as a value. Of course, other values may also be employed in accordance with the present invention while maintaining the scope of the present invention.

Figure 5:
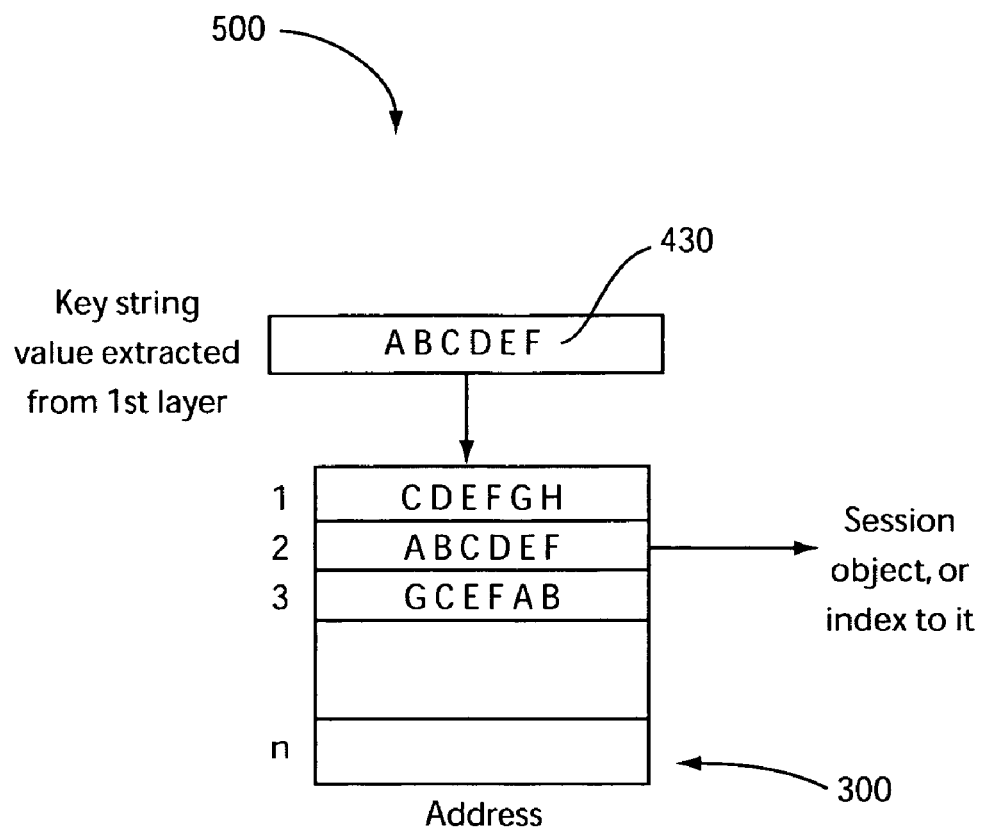
FIG. 5 is a block diagram showing packet pre-processing for a second layer of a two-layered CAM/TCAM hardware accelerator in accordance with the principles of the present invention.

Turning to FIG. 5, packet pre-processing for a second layer of a two-layered CAM/TCAM hardware accelerator is indicated generally by the reference numeral 500. The packet pre-processing 500 may be performed for a second layer of a two-layered CAM/TCAM hardware accelerator such as the second layer 320 of the two-layered CAM/TCAM hardware accelerator 300 shown in FIG. 3, and is described as such herein. Of course, given the teachings of the present invention provided herein, one of ordinary skill in this and related arts may employ the pre-processing 500 with respect to other multi-layered CAM/TCAM hardware accelerators while maintaining the scope of the present invention.

In an exemplary case, the slide window operation is not employed in the second layer 320. The key string 430 extracted from the first layer can be possibly cascaded into, for example, a dialog ID and directly used as the input (address) for the matching operation performed for the strings (addresses) included in the CAM/TCAM 300.

Figure 6:
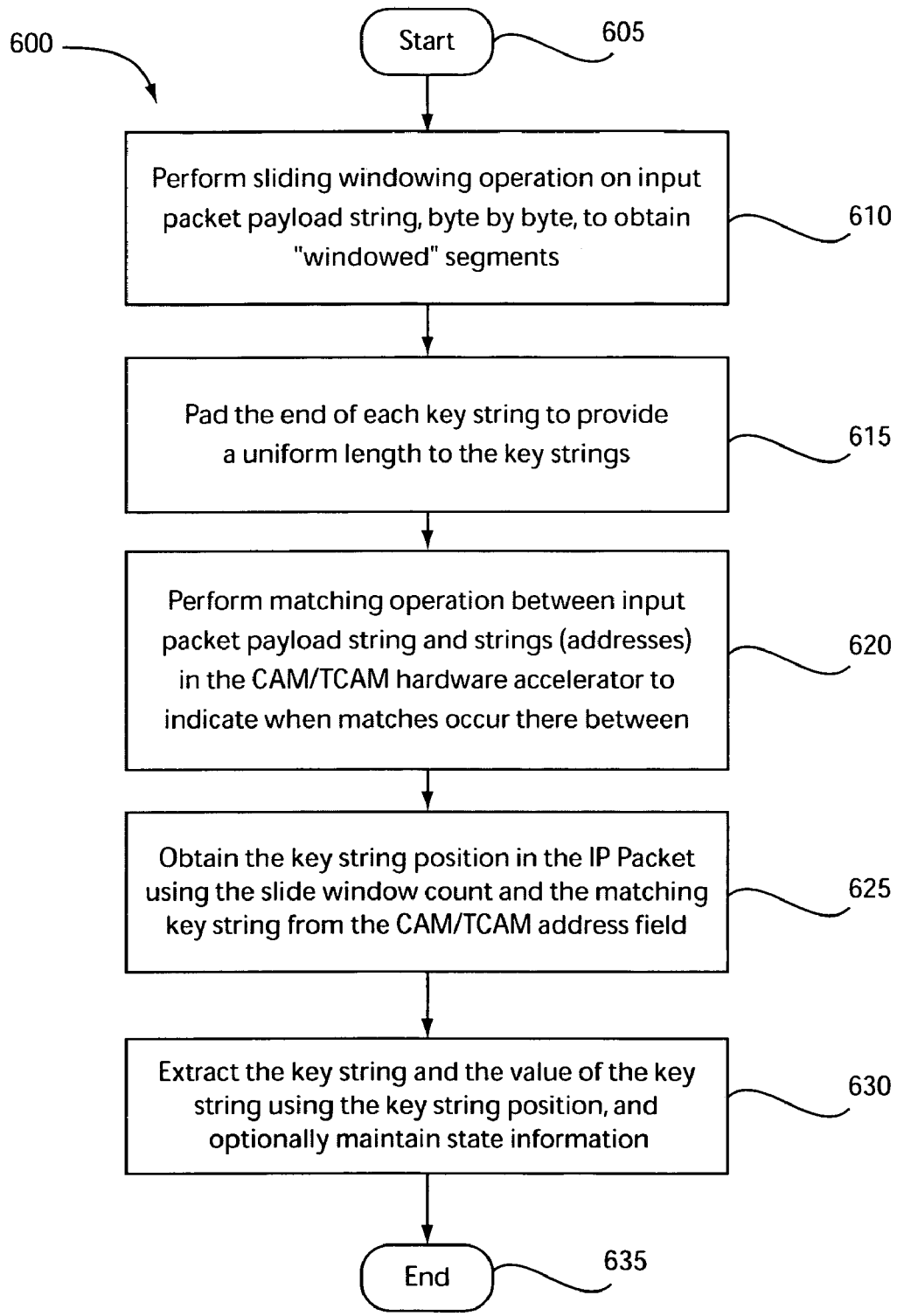
FIG. 6 is a flow diagram of a method for packet pre-processing of a first layer of a two-layered CAM/TCAM hardware accelerator in accordance with the principles of the present invention.
Figure 7:
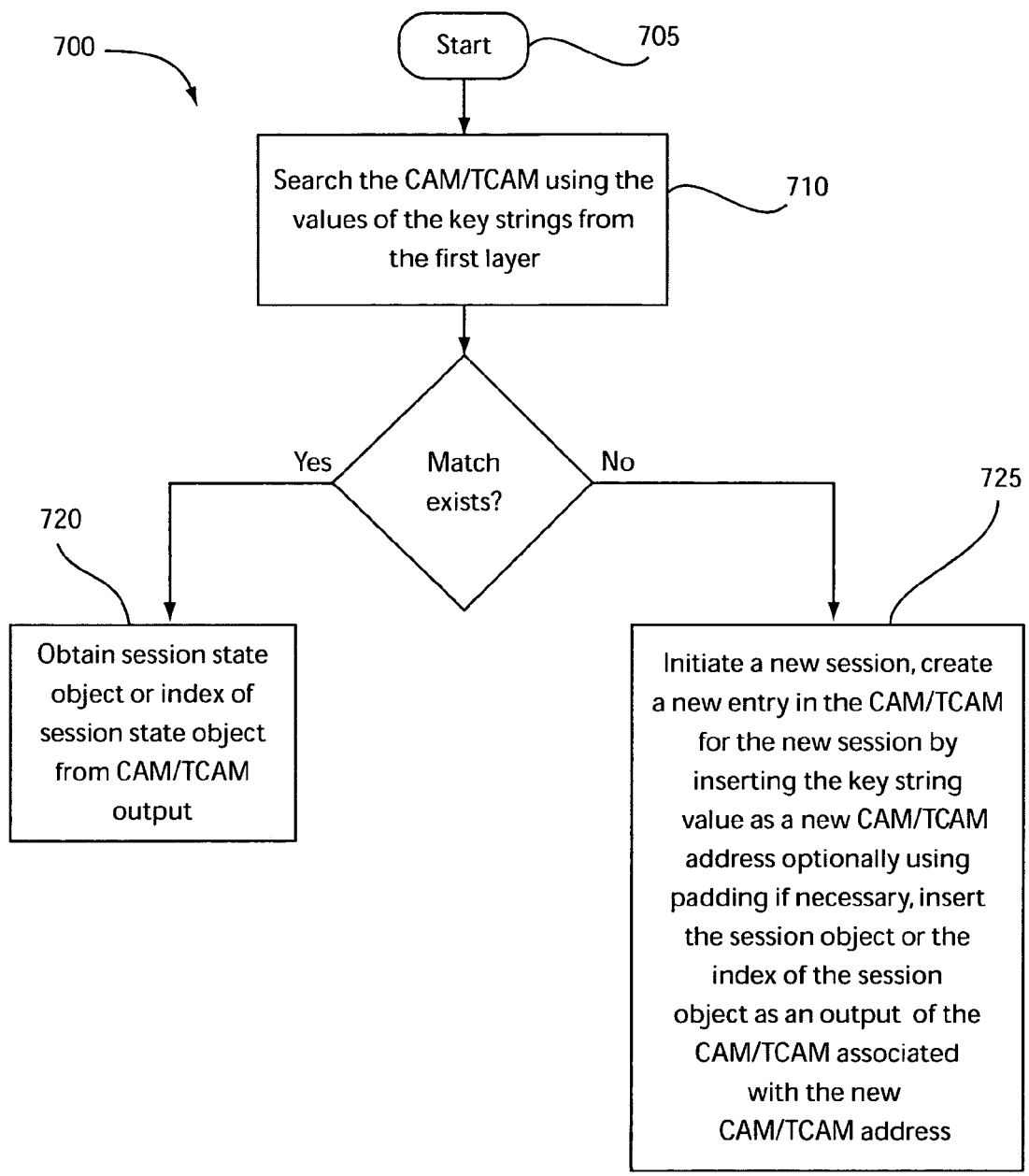
FIG. 7 is a flow diagram of a method for packet pre-processing of a second layer of a two-layered CAM/TCAM hardware accelerator in accordance with the principles of the present invention.

Flowcharts further illustrating the steps performed in packet pre-processing of the first and second layers, as initially described in FIGS. 4 and 5, respectively, are provided with respect to FIGS. 6 and 7, respectively.

Turning to FIG. 6, a method for packet pre-processing of a first layer of a two-layered CAM/TCAM hardware accelerator is indicated generally by the reference numeral 600.

A start block 605 passes control to a function block 610. The function block 610 performs a sliding windowing operation on the input packet payload string byte by byte to obtain "windowed" segments, and passes control to a function block 615. The function block 615 pads the end of each key string to provide a uniform length to the key strings, and passes control to a function block 620.

Regarding function block 615, it is to be noted that every address entry in the CAM/TCAM hardware accelerator 300 represents key strings that may be compared, and that these key strings may be both application and protocol specific. Thus, since each key string has a different length, padding with "don't cares" at the end of each string may be utilized to make the key strings have a uniform length (i.e., the same length).

The function block 620 performs a matching operation between the input packet payload string and strings (addresses) in the CAM/TCAM hardware accelerator 300 to indicate when matches occur there between, and passes control to a function block 625. Regarding function block 620, the matching performed with respect to the SIP protocol may involve, e.g., "branch=", tag=, Call-ID, "From:", and "To:".

The function block 625 obtains the key string position in the IP packet using the slide window count, as well as the matching key string from the CAM/TCAM address field, and passes control to a function block 630. The function block 630 extracts the key string and the value of the key string using the key string position, optionally maintains state information, and then passes control to an end block 635.

Regarding function block 630, the state information may optionally be maintained when some key strings occur, as some applications and protocols utilize these states to correctly identify the occurrence of the key string event. For example, for SIP protocol, the state is recorded when "From" or "To" strings occur. After that, when "tag" string occurs, it can be determined whether or not the "tag" is a "From" tag or "To" tag based on the state. When the "From tag" or "To tag" event is correctly identified, the "From" or "To" state is cleared, and the value of the key string after the event is extracted and correctly identified.

Turning to FIG. 7, a method for packet pre-processing of a second layer of a two-layered CAM/TCAM hardware accelerator is indicated generally by the reference numeral 700.

A start block 705 passes control to a function block 710. The function block 710 searches the CAM/TCAM using the values of the key strings from the first layer, and passes control to a decision block 715. Regarding function block 710, stated another way, the key string value from the first layer is used as the address for the second layer. The padding procedure may be used for the string value to have uniform lengths for the address field. No sliding window mechanism is needed here.

The decision block 715 determines whether or not a match exists between the values of the key strings from the first layer and the key strings in the CAM/TCAM 300. If a match does exist, then control is passed to a function block 720. Otherwise, if a match does not exist, then control is passed to a function block 725.

The function block 720 obtains the session state object or the index of the session state object from the CAM/TCAM output.

The function block 725 initiates a new session, creates a new entry in the CAM/TCAM for this new session by inserting the key string value as a new CAM/TCAM address, optionally using padding, inserts the session object or the index of the session object as the output of CAM/TCAM associated with this new address.

At least two components, namely the layer 7 switch and the SIP application server, can be benefit from a hardware accelerator using a CAM/TCAM in accordance with the invention.

Figure 8:
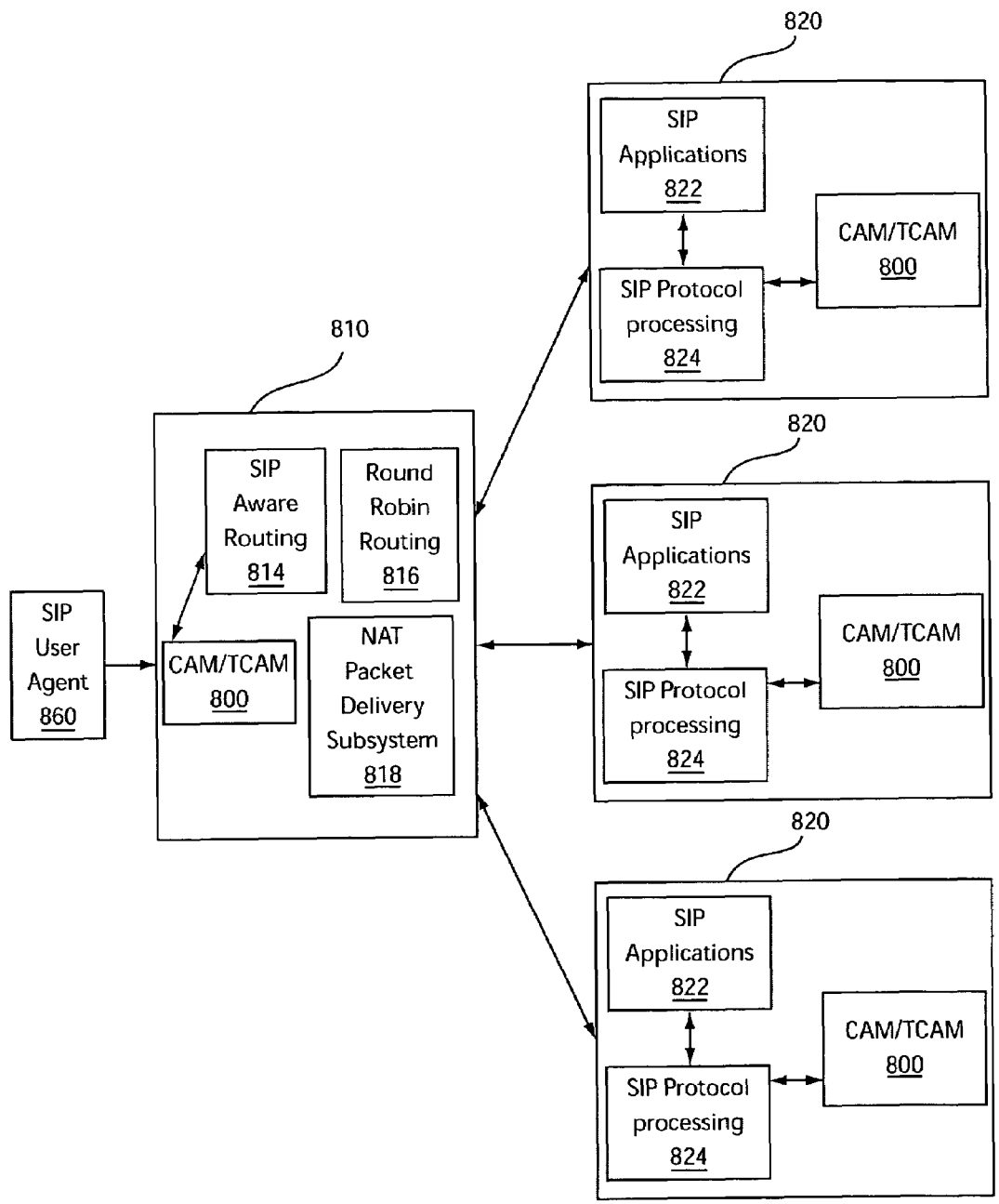
FIG. 8 is a block diagram of a SIP hardware accelerator implemented with respect to a layer 7 switch and a plurality of SIP servers in accordance with the principles of the present invention.

Turning to FIG. 8, a SIP hardware accelerator, implemented with respect to a layer 7 switch and a plurality of SIP servers, is indicated generally by the reference numeral 800.

In FIG. 8, the SIP hardware accelerator 800 is implemented as a CAM/TCAM that is thus designated by the reference numeral 800.

The layer 7 switch 810 includes a CAM/TCAM 800. Moreover, the layer 7 switch 810 further includes a SIP aware routing module 814, a round robin routing module 816, and a network address translation (NAT) packet delivery subsystem 818. The layer 7 switch may interface with a SIP user agent 860.

Each of the SIP servers 820 includes a CAM/TCAM 800. Moreover, each of the SIP servers 820 further includes SIP applications 822 and a SIP protocol-processing module 824.

For the layer 7 switch 810, the CAM/TCAM 800 can accelerate the SIP aware layer 7 routing to route all affiliated SIP packets of the same SIP dialog to the same server for processing. In this case, the CAM/TCAM 800 can output the server ID for the packet routing.

For each of the SIP servers 820, the corresponding CAM/TCAM 800 can accelerate SIP protocol processing to retrieve the SIP session state from the huge pool of existing sessions. In this case, the output of the CAM/TCAM 800 would be the session object or the index of the session object.

Advantageously, the invention also makes use of CAM/TCAM to reduce the string-matching overhead, so as to improve performance. CAM/TCAM can perform parallel string searching at high speed (e.g., 4 ns). This will dramatically accelerate the SIP layer 7 switch as well as the SIP application server.

It is to be appreciated that while the CAM/TCAM in accordance with the principles of the present invention was described herein with respect to two layers, given the teachings of the present invention provided herein, a CAM/TCAM used as a hardware accelerator in accordance with the principles of the present invention is not limited to solely two layers and, thus, a single layer or a number of layers greater than two may also be employed while maintaining the spirit of the present invention.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A hardware accelerator, comprising:
a content access memory (CAM) configured to accelerate, in a first and a second stage, string comparison operations in an application server, said CAM including:
    a key string position identification mechanism configured, for operation in the first stage, to identify positions of key strings from a payload portion of a packet directly input to the CAM with a header portion of the packet being excluded from being input to the CAM, the positions of the key stings being variable within the payload portion;
    a key string content extraction mechanism configured, for operation in the first stage, to extract actual values of the key strings; and
    a key string comparison mechanism configured, for operation in the second stage, to directly compare the extracted actual values of the keys strings to existing non-hashed CAM entries to output session state information from said CAM when a match exists, a creation of the session state information being prior to and unresponsive to any string comparison operations performed by the CAM,
wherein the string comparison operations are performed entirely in an absence of any hash operations being applied to the payload portion, and
wherein an existence of a match to output the session state information is determined entirely in an absence of any matching operations being applied to the session state information.

2. The hardware accelerator according to claim 1, wherein said key string position identification mechanism is configured to parse the payload portion input to the CAM to identify positions of the key strings within the payload portion.

3. The hardware accelerator according to claim 1, wherein said key string position identification mechanism is configured to identify positions of the key strings using a windowing mechanism applied to the payload portion.

4. The hardware accelerator according to claim 1, further comprising a string comparison criteria module for allowing at least one of a computer process and an application to set string comparison criteria for use in the sting comparison operations.

5. The hardware accelerator according to claim 1, wherein said CAM comprises a tri-state content access memory (TCAM).

6. The hardware accelerator according to claim 1, wherein the application server comprises a session initiation protocol (SIP) application server.

7. The hardware accelerator according to claim 5, wherein said CAM is configured to accelerate SIP network dispatching in the SIP application server by directing an affiliated SIP session into the SIP application server.

8. The hardware accelerator according to claim 1, wherein said CAM is configured to accelerate session initiation protocol (SIP) operations involving the sting comparison operations.

9. The hardware accelerator according to claim 1, wherein the application server includes a network hardware accelerator, and said CAM is disposed within the network hardware accelerator.

10. A method for providing acceleration in an application server, comprising:
    accelerating, in a first and a second stage, string comparison operations in the application sewer using a content access memory (CAM), said accelerating step comprising:
        identifying, in the first stage, positions of key strings from a payload portion of a packet directly input to the CAM with a header portion of the packet being excluded from being input to the CAM, the positions of the key strings being variable within the payload portion;
        extracting, in the first stage, actual values of the key strings; and
        directly comparing, in the second stage, the extracted actual values of the keys strings to existing non-hashed CAM entries to output session state information from said CAM when a match exists, a creation of the session state information being prior to and unresponsive to any string comparison operations performed by the CAM,
    wherein the string comparison operations are performed entirely in an absence of any hash operations being applied to the payload portion, and
    wherein an existence of a match to output the session state information is determined entirely in an absence of any matching operations being applied to the session state information.

11. The method according to claim 10, wherein said identifying step comprises parsing the payload portion input to the CAM using a windowing operation to identify positions of die keys strings within the payload portion.

12. The method according to claim 10, wherein said identifying step identifies positions of the key strings using a windowing mechanism applied to the payload portion.

13. The method according to claim 10, wherein said accelerating step further comprises allowing at least one of a computer process and an application to set sting comparison criteria for use in the string comparison operations.

14. The method according to claim 10, wherein said CAM comprises a tri-state content access memory (TCAM).

15. The method according to claim 10, wherein said accelerating step comprises using the CAM to accelerate SIP network dispatching in the SIP application server by directing an affiliated SIP session into the SIP application server.

16. The method according to claim 10, wherein said accelerating step comprises using the CAM to accelerate session initiation protocol (SIP) operations in the application server.

17. A hardware accelerator, comprising:
    a content access memory (CAM) configured to accelerate sting comparison operations in a layer 7 switch using a first and a second stage, said CAM including:
        a key sting position identification mechanism configured, for operation in the first stage, to identify positions of key strings from a payload portion of a packet directly input to the CAM with a header portion of the packet being excluded from being input to the CAM, the positions of the key strings being variable within the payload portion;
        a key string content extraction mechanism configured, for operation in the first stage to extract actual values of the key strings; and
        a key string comparison mechanism configured, for operation in the second stage, to directly compare the extracted actual values of the keys strings to existing non-hashed CAM entries to output session state information from said CAM when a match exists, a creation of the session state information being prior to and unresponsive to any string comparison operations performed by the CAM,
    wherein the string comparison operations are performed entirely in an absence of any hash operations being applied to the payload portion, and
    wherein an existence of a match to output the session state information is determined entirely in an absence of any matching operations being applied to the session state information.

18. A method for providing acceleration in a layer 7 switch, comprising:
    accelerating, in a first and a second stage, sting comparison operations in the layer 7 switch using a content access memory (CAM), said accelerating step comprising:
        identifying, in the first stage, positions of key strings from a payload portion of a packet directly input to the CAM with a header portion of the packet being excluded from being input to the CAM, the positions of the key strings being variable within the payload portion;
        extracting, in the first stage, actual values of the key strings; and
        directly comparing, in the second stage, the extracted actual values of the keys strings to existing non-hashed CAM entries to output session state information from said CAM when a match exists, a creation of the session state information being prior to and unresponsive to any string comparison operations performed by the CAM,
    wherein the string comparison operations are performed entirely in an absence of any hash operations being applied to the payload portion, and
    wherein an existence of a match to output the session state information is determined entirely in an absence of any matching operations being applied to the session state information.

19. The hardware accelerator according to claim 1, wherein an actual value of at least one of the key strings is cascaded into a dialog identifier to obtain a cascaded result from the first stage of the CAM and the cascaded result is directly used as an input to the second stage, wherein the cascaded result is directly compared to the CAM entries.

20. The hardware accelerator according to claim 1, wherein the current session is a session initiation protocol session, and an actual value of the session state information is directly used to route a session initiation protocol packet in which a corresponding key string is included.

21. The hardware accelerator according to claim 20, wherein the actual value of the session state information comprises a server identifier.

22. The hardware accelerator according to claim 1, wherein the session state information is provided when the match exists, and is unused in determining whether the match exists in the first place.

23. The hardware accelerator according to claim 1, wherein the session state information is different than the actual values of the key strings.

24. The hardware accelerator according to claim 1, wherein the CAM comprises session state information for a plurality of different session initiation protocol sessions, a particular one of the key string relates to a particular one of the plurality of different session initiation protocol sessions, and said key string comparison mechanism outputs the session state information for the particular one of the plurality of different session initiation protocol sessions when the particular one of the key strings matches a particular one of the non-hashed CAM entries.

25. The hardware accelerator according to claim 1, wherein the non-hashed CAM entries correspond to a plurality of different session initiation protocol sessions, and wherein an actual value of a particular key string is added to die CAM as a new non-hashed CAM entry and session state information for the particular key string is output, when the match does not exist.

26. The hardware accelerator according to claim 25, wherein the actual values of the key stings are generated during and as a result of the plurality of different session initiation protocol sessions, and are unknown to the CAM before being subjected to the string comparison operations.

* * * * *